(12) United States Patent
Forster et al.

(10) Patent No.: US 9,734,365 B2
(45) Date of Patent: Aug. 15, 2017

(54) METHOD FOR PREVENTING UNAUTHORIZED DIVERSION OF NFC TAGS

(71) Applicant: Avery Dennison Corporation, Pasadena, CA (US)

(72) Inventors: Ian J. Forster, Essex (GB); Adrian N. Farr, Essex (GB)

(73) Assignee: AVERY DENNISON RETAIL INFORMATION SERVICES, LLC, Westborough, MA (US)

(*) Notice: Subject to any disclaimer, the term of this patent is extended or adjusted under 35 U.S.C. 154(b) by 0 days.

(21) Appl. No.: 13/803,080

(22) Filed: Mar. 14, 2013

(65) Prior Publication Data

US 2014/0070923 A1 Mar. 13, 2014

Related U.S. Application Data

(60) Provisional application No. 61/698,839, filed on Sep. 10, 2012.

(51) Int. Cl.
 *H04Q 5/22* (2006.01)
 *G06K 7/10* (2006.01)
 *G06K 19/077* (2006.01)

(52) U.S. Cl.
 CPC ... *G06K 7/10257* (2013.01); *G06K 19/07749* (2013.01)

(58) Field of Classification Search
 None
 See application file for complete search history.

(56) References Cited

U.S. PATENT DOCUMENTS

| | | | |
|---|---|---|---|
| 1,331,136 A | 2/1920 | Guy | |
| 5,083,111 A * | 1/1992 | Drucker et al. | 340/572.1 |
| 5,485,291 A | 1/1996 | Qiao | |
| 5,641,219 A | 6/1997 | Mizobe | |

(Continued)

FOREIGN PATENT DOCUMENTS

| | | |
|---|---|---|
| BR | PI0611910 | 2/2011 |
| CN | 101253750 | 8/2008 |

(Continued)

OTHER PUBLICATIONS

"AN1445: Antenna design guide for MFRC52x, PN51x and PN53x, Rev.1.2, Document AN1445_12", NXP B.V., (Oct. 11, 2010), 65 pgs.

(Continued)

*Primary Examiner* — Curtis King
(74) *Attorney, Agent, or Firm* — Avery Dennison Retail Information Services, LLC

(57) ABSTRACT

A method, system and apparatus for pairing authorized NFC enabled RFID devices with an intended object or product. The method, system and apparatus can include a primary RFID with a radio frequency identification chip, a coil antenna, a bridge and a substrate; an association of the at least primary RFID device with an object; an integration of a material into one of the at least primary RFID device and the object that provides the RFID device with a predetermined resonant frequency; and the detuning of one or more secondary communication devices located proximate the RFID device.

12 Claims, 4 Drawing Sheets

(56) References Cited

U.S. PATENT DOCUMENTS

| | | |
|---|---|---|
| 5,720,123 A | 2/1998 | Taylor |
| 5,867,017 A | 2/1999 | Merwin et al. |
| 5,921,674 A | 7/1999 | Koczi |
| 5,944,405 A | 8/1999 | Takeuchi |
| 5,947,578 A | 9/1999 | Ayres |
| 6,142,375 A | 11/2000 | Belka et al. |
| 6,144,264 A | 11/2000 | Wen |
| 6,246,778 B1 | 6/2001 | Moore |
| 6,771,256 B1 | 8/2004 | Abraham et al. |
| 6,786,626 B2 | 9/2004 | Wu |
| 6,838,989 B1 | 1/2005 | Mays et al. |
| 6,839,035 B1 | 1/2005 | Addonisio et al. |
| 6,851,999 B2 | 2/2005 | Fong |
| 6,965,205 B2 | 11/2005 | Piepgras et al. |
| 7,012,544 B2 | 3/2006 | Cunningham et al. |
| 7,046,160 B2 | 5/2006 | Pederson et al. |
| 7,064,498 B2 | 6/2006 | Dowling et al. |
| 7,084,769 B2 | 8/2006 | Bauer et al. |
| 7,086,769 B1 | 8/2006 | Thompson et al. |
| 7,098,794 B2 | 8/2006 | Lindsay |
| 7,109,986 B2 | 9/2006 | Kerr et al. |
| 7,167,106 B2 | 1/2007 | Haase |
| 7,202,838 B2 | 4/2007 | Kerr et al. |
| 7,304,577 B2 | 12/2007 | Waldner |
| 7,375,650 B2 | 5/2008 | Lo |
| 7,377,421 B2 | 5/2008 | Rhoads |
| 7,378,973 B2 | 5/2008 | Dixon |
| 7,477,152 B2 | 1/2009 | Forster |
| 7,490,054 B2 | 2/2009 | Reade et al. |
| 7,492,346 B2 | 2/2009 | Manabe |
| 7,495,576 B2 | 2/2009 | Maskeny et al. |
| 7,515,149 B2 | 4/2009 | Kerr et al. |
| 7,564,426 B2 | 7/2009 | Poor |
| 7,600,906 B2 | 10/2009 | Chon |
| 7,654,723 B2 | 2/2010 | Chang |
| 7,670,020 B2 | 3/2010 | Chang |
| 7,695,165 B2 | 4/2010 | Chang |
| 7,722,172 B2 | 5/2010 | Silverbrook |
| 7,722,241 B2 | 5/2010 | Chang |
| 7,750,810 B2 | 7/2010 | Ritter et al. |
| 7,752,790 B1 | 7/2010 | Michael et al. |
| 7,756,467 B2 | 7/2010 | Bent et al. |
| 7,810,983 B2 | 10/2010 | Chang |
| 7,817,045 B2 | 10/2010 | Onderko |
| 7,845,823 B2 | 12/2010 | Mueller |
| 7,850,341 B2 | 12/2010 | Mrakovich |
| 7,868,778 B2 | 1/2011 | Kenwright |
| 7,876,101 B2 | 1/2011 | Lee |
| 7,903,103 B2 | 3/2011 | Osterberg et al. |
| 7,920,050 B2 | 4/2011 | Juels |
| 7,959,326 B2 | 6/2011 | Laporte |
| 7,961,097 B2 | 6/2011 | Porte et al. |
| 7,979,026 B2 | 7/2011 | Hulvey |
| 8,014,722 B2 | 9/2011 | Abel et al. |
| 8,018,345 B2 | 9/2011 | Xiang |
| 8,102,797 B2 | 1/2012 | Abel |
| 8,112,066 B2 | 2/2012 | Ayed |
| 8,117,445 B2 | 2/2012 | Werner et al. |
| 8,126,505 B2 | 2/2012 | Tulloch |
| 8,249,935 B1 | 8/2012 | DiMartino et al. |
| 8,321,922 B1 | 11/2012 | Lo et al. |
| 8,332,272 B2 | 12/2012 | Fisher |
| 8,469,269 B2 | 6/2013 | Daily et al. |
| 8,655,286 B2 | 2/2014 | Mendolia |
| 2002/0030992 A1 | 3/2002 | Lefebvre |
| 2002/0036622 A1 | 3/2002 | Jaeger et al. |
| 2002/0154633 A1 | 10/2002 | Shin |
| 2002/0159246 A1 | 10/2002 | Murasko et al. |
| 2002/0186133 A1 | 12/2002 | Loof |
| 2003/0029918 A1 | 2/2003 | Leanheart et al. |
| 2003/0034985 A1 | 2/2003 | Needham Riddle |
| 2003/0115096 A1 | 6/2003 | Reynolds |
| 2004/0012486 A1 | 1/2004 | Mani |
| 2004/0220860 A1 | 11/2004 | Persky et al. |
| 2005/0017071 A1 | 1/2005 | Noonan |
| 2005/0280631 A1 | 12/2005 | Wong et al. |
| 2006/0028822 A1 | 2/2006 | Tanamachi |
| 2006/0080819 A1 | 4/2006 | Mcallister |
| 2006/0090384 A1 | 5/2006 | Woodruff |
| 2006/0160488 A1 | 7/2006 | Sueoka et al. |
| 2006/0214794 A1 | 9/2006 | Wang |
| 2006/0215958 A1 | 9/2006 | Yeo |
| 2006/0261938 A1 | 11/2006 | Lai |
| 2006/0266824 A1 | 11/2006 | Hassenbueger |
| 2006/0273176 A1* | 12/2006 | Audebert et al. ............ 235/451 |
| 2006/0290501 A1 | 12/2006 | Hammad et al. |
| 2006/0293956 A1 | 12/2006 | Walker et al. |
| 2007/0008140 A1 | 1/2007 | Saarisalo et al. |
| 2007/0013479 A1 | 1/2007 | Goel et al. |
| 2007/0029939 A1 | 2/2007 | Burkum et al. |
| 2007/0056871 A1 | 3/2007 | Griffiths |
| 2007/0075145 A1* | 4/2007 | Arendonk ..................... 235/492 |
| 2007/0090954 A1 | 4/2007 | Mahaffey |
| 2007/0120772 A1 | 5/2007 | Kim et al. |
| 2007/0145152 A1 | 6/2007 | Jogand-Coulomb et al. |
| 2007/0188483 A1 | 8/2007 | Bonner |
| 2007/0215685 A1 | 9/2007 | Self et al. |
| 2007/0229250 A1 | 10/2007 | Recker |
| 2007/0273951 A1 | 11/2007 | Ribi |
| 2007/0274242 A1 | 11/2007 | Lamacraft et al. |
| 2008/0022160 A1 | 1/2008 | Chakraborty |
| 2008/0040845 A1 | 2/2008 | Shoshan |
| 2008/0064346 A1 | 3/2008 | Charrat |
| 2008/0094854 A1 | 4/2008 | Coleman |
| 2008/0101400 A1* | 5/2008 | Auterinen ..................... 370/463 |
| 2008/0117047 A1 | 5/2008 | Collins et al. |
| 2008/0132167 A1 | 6/2008 | Bent et al. |
| 2008/0150719 A1 | 6/2008 | Cote et al. |
| 2008/0183581 A1 | 7/2008 | Coppolani et al. |
| 2008/0191878 A1 | 8/2008 | Abraham |
| 2008/0192932 A1 | 8/2008 | Graeber et al. |
| 2008/0219227 A1 | 9/2008 | Michaelis |
| 2008/0238706 A1 | 10/2008 | Kenwright |
| 2008/0248815 A1 | 10/2008 | Busch |
| 2008/0251582 A1 | 10/2008 | Nguyen |
| 2008/0262928 A1 | 10/2008 | Michaelis |
| 2008/0276507 A1 | 11/2008 | Hines |
| 2008/0300985 A1 | 12/2008 | Shamp et al. |
| 2009/0081943 A1* | 3/2009 | Dobyns et al. ..................... 455/1 |
| 2009/0085746 A1 | 4/2009 | Ericikson et al. |
| 2009/0088229 A1 | 4/2009 | Hammad et al. |
| 2009/0102748 A1 | 4/2009 | Stoyer et al. |
| 2009/0115614 A1 | 5/2009 | Bertin |
| 2009/0146814 A1 | 6/2009 | Hammad et al. |
| 2009/0168441 A1 | 7/2009 | Lin |
| 2009/0189816 A1 | 7/2009 | Nikiti |
| 2009/0192937 A1 | 7/2009 | Griffin et al. |
| 2009/0193500 A1 | 7/2009 | Griffin |
| 2009/0197551 A1 | 8/2009 | Paraskake |
| 2009/0212919 A1 | 8/2009 | Selgrath et al. |
| 2009/0221240 A1 | 9/2009 | Zhang |
| 2009/0257242 A1 | 10/2009 | Wendman |
| 2009/0258678 A1 | 10/2009 | Chava et al. |
| 2009/0292816 A1 | 11/2009 | Etchegoyen |
| 2009/0297157 A1 | 12/2009 | Nakagawa |
| 2009/0315670 A1 | 12/2009 | Naressi |
| 2010/0009627 A1 | 1/2010 | Huomo |
| 2010/0012715 A1 | 1/2010 | Williams |
| 2010/0046198 A1 | 2/2010 | Hoffman |
| 2010/0066561 A1* | 3/2010 | Ulrich et al. ............ 340/870.07 |
| 2010/0075666 A1 | 3/2010 | Garner |
| 2010/0079416 A1 | 4/2010 | Chung et al. |
| 2010/0082485 A1 | 4/2010 | Lin et al. |
| 2010/0085774 A1 | 4/2010 | Park |
| 2010/0107463 A1 | 5/2010 | Spiro |
| 2010/0141452 A1 | 6/2010 | Lian et al. |
| 2010/0148964 A1 | 6/2010 | Broer |
| 2010/0148965 A1 | 6/2010 | Alexis et al. |
| 2010/0161410 A1 | 6/2010 | Tulloch |
| 2010/0172149 A1 | 7/2010 | Siemiet |
| 2010/0174599 A1 | 7/2010 | Rosenblatt et al. |
| 2010/0188842 A1 | 7/2010 | Yohananoff |
| 2010/0211431 A1 | 8/2010 | Lutnick et al. |
| 2010/0216396 A1 | 8/2010 | Fernandez et al. |

(56) References Cited

U.S. PATENT DOCUMENTS

| | | |
|---|---|---|
| 2010/0217709 A1 | 8/2010 | Aabye et al. |
| 2010/0231362 A1 | 9/2010 | Smith et al. |
| 2010/0255865 A1 | 10/2010 | Karmarkar et al. |
| 2010/0262449 A1 | 10/2010 | Monteforte et al. |
| 2010/0269383 A1 | 10/2010 | Nifenecker |
| 2010/0271839 A1 | 10/2010 | Chan |
| 2010/0274859 A1 | 10/2010 | Bucuk |
| 2010/0275265 A1 | 10/2010 | Fiske |
| 2010/0282849 A1 | 11/2010 | Mair |
| 2010/0290251 A1 | 11/2010 | Wang |
| 2010/0294835 A1 | 11/2010 | Bam et al. |
| 2010/0303230 A1 | 12/2010 | Taveau et al. |
| 2010/0306076 A1 | 12/2010 | Taveau |
| 2010/0306819 A1 | 12/2010 | Nahari et al. |
| 2010/0311326 A1 | 12/2010 | Klabunde et al. |
| 2011/0000971 A1 | 1/2011 | Onderko |
| 2011/0047759 A1 | 3/2011 | Reiter |
| 2011/0084814 A1 | 4/2011 | Ramsch |
| 2011/0112918 A1 | 5/2011 | Mestre et al. |
| 2011/0112920 A1 | 5/2011 | Mestre et al. |
| 2011/0149596 A1 | 6/2011 | Lv |
| 2011/0165859 A1 | 7/2011 | Wengrovitz |
| 2011/0191478 A1 | 8/2011 | Eischeid et al. |
| 2011/0195748 A1 | 8/2011 | Main et al. |
| 2011/0211344 A1 | 9/2011 | Harbers |
| 2011/0225421 A1 | 9/2011 | Han et al. |
| 2011/0227487 A1 | 9/2011 | Nichol |
| 2011/0227507 A1 | 9/2011 | Salm |
| 2011/0228517 A1 | 9/2011 | Kawabat |
| 2011/0234379 A1 | 9/2011 | Lee |
| 2011/0235318 A1 | 9/2011 | Simon |
| 2011/0238995 A1 | 9/2011 | Blanco |
| 2011/0287718 A1 | 11/2011 | Abel |
| 2011/0295108 A1 | 12/2011 | Cox et al. |
| 2011/0307309 A1 | 12/2011 | Forster et al. |
| 2011/0320291 A1 | 12/2011 | Coon |
| 2011/0320314 A1 | 12/2011 | Brown |
| 2011/0320345 A1 | 12/2011 | Taveau et al. |
| 2012/0001725 A1 | 1/2012 | Chen |
| 2012/0013448 A1 | 1/2012 | Baranowski |
| 2012/0024951 A1 | 2/2012 | Graeber |
| 2012/0032632 A1 | 2/2012 | Soar |
| 2012/0039472 A1 | 2/2012 | Liu et al. |
| 2012/0059741 A1 | 3/2012 | Khan et al. |
| 2012/0061465 A1 | 3/2012 | Luo |
| 2012/0072979 A1 | 3/2012 | Cha |
| 2012/0075148 A1 | 3/2012 | Cho |
| 2012/0083205 A1 | 4/2012 | Marcu et al. |
| 2012/0089845 A1 | 4/2012 | Raleigh |
| 2012/0154633 A1 | 6/2012 | Rodriguez |
| 2012/0156992 A1 | 6/2012 | Walker et al. |
| 2013/0006847 A1 | 1/2013 | Hammad et al. |
| 2013/0106576 A1 | 5/2013 | Hinman et al. |
| 2013/0173455 A1 | 7/2013 | Adams et al. |
| 2013/0309965 A1 | 11/2013 | Hillan |
| 2013/0344805 A1 | 12/2013 | Lefley |
| 2014/0070850 A1 | 3/2014 | Darwhekar et al. |
| 2014/0113551 A1 | 4/2014 | Krishnan et al. |

FOREIGN PATENT DOCUMENTS

| | | |
|---|---|---|
| CN | 201302803 | 9/2009 |
| CN | 201302803 Y | 9/2009 |
| CN | 102217410 | 10/2011 |
| EP | 1127469 B1 | 7/2003 |
| EP | 1914631 | 4/2008 |
| EP | 2143991 | 1/2010 |
| EP | 1948995 | 4/2010 |
| EP | 1792272 B1 | 10/2010 |
| EP | 2237519 | 10/2010 |
| EP | 2296025 | 3/2011 |
| EP | 2309431 A1 | 4/2011 |
| EP | 2366937 | 9/2011 |
| EP | 2371110 | 10/2011 |
| FR | 2783960 | 3/2000 |
| JP | 2006011422 | 1/2006 |
| JP | 2006030882 | 2/2006 |
| JP | 2006058435 | 3/2006 |
| JP | 2006349887 | 12/2006 |
| JP | 2007034362 | 2/2007 |
| JP | 2002162918 | 6/2007 |
| KR | 20100072115 | 6/2010 |
| WO | 2006095212 | 9/2006 |
| WO | 2006098765 | 9/2006 |
| WO | 2006111782 | 10/2006 |
| WO | 2007002459 | 1/2007 |
| WO | 2007035835 | 3/2007 |
| WO | 2007064069 | 6/2007 |
| WO | 2008034937 | 3/2008 |
| WO | 2008063706 | 5/2008 |
| WO | 2008087431 | 7/2008 |
| WO | 2008132269 | 11/2008 |
| WO | 2008142455 | 11/2008 |
| WO | WO-2008132269 | 11/2008 |
| WO | 2006031824 | 3/2009 |
| WO | 2009028203 | 3/2009 |
| WO | 2010077194 | 7/2010 |
| WO | 2010095988 | 8/2010 |
| WO | 2010148816 | 12/2010 |
| WO | 2011010970 | 1/2011 |
| WO | 2011020041 | 2/2011 |
| WO | 2011033424 | 3/2011 |
| WO | 2011053914 | 5/2011 |
| WO | 2011088190 | 7/2011 |
| WO | 2011094384 | 8/2011 |
| WO | 2011109092 | 9/2011 |
| WO | 2011112778 | 9/2011 |
| WO | 2011121488 | 10/2011 |
| WO | 2012037255 | 3/2012 |

OTHER PUBLICATIONS

"Radio-Frequency-IDentific@tion, http://rfid-handbook.com/", advertisement (Dec. 2, 2011), 5 pgs.

Bauer-Reich, C., et al. "Low-profile, high-permeability antennaless RFID tags for use on metal objects", Proceedings of the 2012 IEEE International Workshop on Antenna Technology (iWAT), (Mar. 5-7, 2012), 32-35.

Bovelli, S., "A Novel Antenna Design for Passive RFID Transponders on Metal Surfaces", Proceedings of the 36th European Microwave Conference, Manchester, UK (Sep. 2006), 580-582.

Cavoukian, A., "Mobile Near Field Communications (NFC)— "Tap'n Go"—Keep it Secure & Private", Information and Privacy Commissioner, Ontario, Canada / Privacy by Design (Nov. 2011), 22 pgs.

Christianson, B., et al. (eds.), "Security Protocols", 13th International Workshop, Revised Selected Papers, Cambridge, UK , (Apr. 20-22, 2005), Lecture Notes in Computer Science , 4631, Springer-Verlag, Berlin, 354 pgs.

Cole, P.H., et al., Networked RFID Systems and Lightweight Cryptography: Raising Barriers to Product Counterfeiting, First Edition, Springer-Verlag, Berlin (2003), 350 pgs.

Turcu, C. (ed.), Development and Implementation of RFID Technology, In-Teh, I-Tech Education and Publishing KG, Vienna, Austria (Feb. 2009), 564 pgs.

Dodson, B., et al., "Micro-Interactions with NFC-Enabled Mobile Phones", Proceedings of the Third International Conference on Mobile Computing, Applications, and Services (MobiCASE), Los Angeles, CA, Oct. 2011. Retrieved from the Internet: <URL: http://mobisocial.stanford.edu/papers/mobicase11.pdf >, 20 pgs.

Finkenzeller, K., "Known attacks on RFID systems, possible countermeasures and upcoming standardization activities", presentation slides, RFID-Systech, Bremen, Germany, Jun. 2009. Retrieved from the Internet: <URL: http://rfid-handbook.de/downloads/Finkenzeller_Systech-Bremen-2009_v1.0.pdf>, 31 pgs.

Gebhart, M, et al., "Design of 13.56 MHz Smartcard Stickers with Ferrite for Payment and Authentication", Proceedings of the 2011 3rd International Workshop on Near Field Communication (NFC), Feb. 21-22, 2011. Retrieved from the Internet: <URL: https://online.

(56) References Cited

OTHER PUBLICATIONS tugraz.at/tug_online/voe_main2.
getVollText?pDocumentNr=202812&pCurrPk=59398>, 6 pgs.
Hancke, G.P., "Practical Eavesdropping and Skimming Attacks on High-Frequency RFID Tokens", Preprint version of article published in Journal of Computer Security. vol. 19, Issue 2. (Jun. 2010). Retrieved from the Internet: <URL: http://www.rfidblog.org.uk/Hancke-JoCSSpecialRFIDJune2010.pdf>, 23 pgs.
Hancke, G.P., "Security of proximity identification systems", Technical Report, No. 752, University of Cambridge Computer Laboratory, UK (Jul. 2009), 161 pgs.
Hinske, S., et al., "RFIDice—Augmenting Tabletop Dice with RFID", Journal of Virtual Reality and Broadcasting, vol. 5, No. 4, (2008), 12 pgs.
Johnansson, B., "An Introduction to RFID—Information Security and Privacy Concerns", TDDC03 Projects, (Spring 2004), 14 pgs.
Juels, A., et al., "The Blocker Tag: Selective Blocking of RFID Tags for Consumer Privacy", Proceedings of ACC CCS'03, Washington, DC (Oct. 27-30, 2003), 9 pgs.
Jung, M, et al., "All-Printed and Roll-to-Roll Printable 13.56-MHz-Operated 1-bit RF Tag on Plastic Foils", IEEE Transactions on Electron Devices, (Feb. 19, 2010), 10 pgs.
Kortvedt, H.S., "Securing Near Field Communication", Thesis for Master of Science in Communication Technology, Norwegian University of Science and Technology, (Jun. 2009), 135 pgs.
Kuo, S., "A performance evaluation method for EMI sheet of metal mountable HR RFID tag", Measurement, 44 (2011), 946-953.
Mitrokotsa, A., et al., "Classification of RFID Attacks", Proceedings of the 2nd International Workshop on RFID Technology—Concepts, Applications, Challenges (IWRT 2008), in conjunction with the 10th International Conference on Enterprise Information Systems, pp. 73-86, Barcelona, Spain, Jun. 2008. INSTICC Press, Portugal. Retrieved from the Internet: <URL: http://www.cs.vu.nl/~ast/publications/iwrt-2008.pdf>.
Mulliner, Collin, "Attacking NFC Mobile Phones", 25th Chaos Communication Congress, Berlin, Germany (Dec. 2008). Retrieved from the Internet: <URL: http://www.mulliner.org/nfc/feed/collin_mulliner_25c3_attacking_nfc_phones.pdf>, 71 pgs.
Oren, Y., "Attacks on RFID-Based Electronic Voting System", Cryptology ePrint Archive, Report 2009/442 (2009). Retrieved from the Internet: <URL: http://eprint.iacr.org/2009/422.pdf>, 21 pgs.
Rieback, M.R., et al., "A Platform for RFID Security and Privacy Administration", Proceedings of the 20th USENIX/SAGE Large Installation System Administration conference (LISA 2006), Washington D.C., (Dec. 2006). Retrieved from the Internet: <URL: http://www.rfidguardian.org/images/a/a9/Lisa.06.pdf>, 14 pgs.
Rieback, M.R., et al., "The Evolution of RFID Security", Pervasive Computing (Jan.-Mar. 2006), 62-69.
Roland, M., "Security Vulnerabilities of the NDEF Signature Record Type", Presentation from WIMA 2011—NFC Research Track, Monaco (Apr. 19, 2011). Retrieved from the Internet: <URL: http://www.wima.mc/dan/2011/CONF_PDF/TUESDAY/AM/ROLAND.pdf>, 14 pgs.
Sabzevar, A.P., "Security in RFID Systems" Project report for GMU ECE 646 (2004). Retrieved from the Internet: <URL: http://teal.gmu.edu/courses/ECE646/project/reports_2004/SP-4_report.pdf>, 13 pgs.
Sarma, S.E., et al., "RFID Systems and Security and Privacy Implications", CHES 2002, LNCS 2523, B.S. Kaliski Jr. et al. (Eds.) (2003), pp. 454-469, 2003.
Suh, J., "Introduction to composite electromagnetic noise absorber technology" EMC Directory & Design Guide, (2007), 4 pgs.
Varshney, L.R., et al., "Securing Inductively-Coupled Communication", Information Theory and Applications Workshop (ITA) (Feb. 5-10, 2012), 6 pgs.
Vidano, R., "13.56-MHz Inductively Coupled Card Compatibility to Conducting Surfaces", Proceedings of Asia-Pacific Microwave Conference (2007), 4 pgs.
Wang, J.J.H., "Spiral Antennas in RFID and Their Size Reduction and Performance Enhancement", 2007 IEEE International Workshop on Anti-counterfeiting, Security, Identification (Apr. 16-18, 2007), 44-47.
Wegleiter, H. et al., "Automatic Antenna Tuning Unit to Improve RFID System Performance", IEEE Transactions on Instrumentation and Measurement, vol. 60, No. 8,(Aug. 2011), 2797-2803.
Weis, Stephen A, "Security and Privacy Aspects of Low-Cost Radio Frequency Identification Systems", Security in Pervasive Computing 2003, LNCS 2802, D. Hutter et al. (Eds.) (2004) 201-212.
Yamada, I., et al., "Secure Active RFID Tag System", Ubicomp2005 Workshops, 5 pgs.
Zhu, H., et al., "Solutions of Metal Surface Effect for HF RFID Systems", 2007 International Conference on Wireless Communications, Networking and Mobile Computing (WiCom), (Sep. 21-25, 2007), 2089-2092.
International Preliminary Report on Patentability and Written Opinion dated May 19, 2015 for International Application PCT/US12/0031131 filed Mar. 14, 2013.
Thamilarasu G et al: "Intrusion detection in RFID systems", Military Communications Conference, 2008, pp. 1-7.
Christian Metzger et al: "Making Radio Frequency Indentificaiton Visible—A Watchdog Tag", Fifth Annual IEEE International Conference on pervasive computing and communications workshops, Mar. 19-23, 2007.
R. Rieback, N. Gaydadjiev: "A Platform for RFID Security and Provacy Adminstration", Aug. 28, 2006, retrieved from internet URL: http://www.cs.vu.nl/~ast/publications/lisa-2006.pdf.
Hend S. Al-Khalifa: "Utilizing QR Code and Mobile Phones for Blinds and Visually Impaired People", copyright 2008.
Enabling RFID in Retail, George Roussos, Birkbeck, University of London, IEEE Computer Society, Mar. 2006.
Bling: NFC Arrives in U.S., Sam Churchill, Oct. 27, 2010, http://www.dailywireless.org/2010/10/27/bling-nfc-arrives-in-u-s/.
A Near Field Communication Tool for Building Intelligent Environment using Smart Posters, International Journal of Computers and Communications, Issue 1, vol. 4, 2010, Pilar Castro Garrido, Guillermo Matas Miraz, Irene Luque Ruiz, and Miguel Angel Gomez-Nieto.
RFID based applications in culture, media and creative industries, 2011 Third International Workshop on Near Field Communication, Eileen Kuehn, Jens Reinhardt, Stephan Bergemann, Prof. Dr. Juergen Sieck.
NFC Mobile Parlor Games Enabling Direct Player to Player Interaction, 2011 Third International Workshop on Near Field Communication, Avinash Nandwani, Paul Coulton, Reuben Edwards.
Encrypted NFC emergency tags based on the German Telematics Infrastructure, 2011 Third International Workshop on Near Field Communication, Sebastian Dunnebeil, Felix Kobler, Philip Koene, Helmut Kremar, Jan Marco Leimeister.
Switching the role of NFC tag and reader for the implementation of Smart Posters, 2012 4th International Workshop on Near Field Communication; Dirk Volland, Kay Noyen, Onur Kayikei, Lukas Ackermann, Florian Michahelles.
The "Weak Spots" in Stacked UHF RFID Tags in NFC Applications, IEEE Reid 2010; Xiaosheng Chen, Feng Lu, Terry T.Ye*.
Near Field Communications Handbook, vol. 13 of Internet and Communications, 2009; Mohammad Ilyas.
NFC-CAP Securty Assessment, vol. 1.0—May 11, 2009; Diego A. Ortiz-Yepes.
NFC and Mobile Payments Today, Andre Filipe de Axevedo Figueiredo Cruz, Nov. 2011.
Enhancing Security and Usability Features of NFC, 2009; Beygo, Omer Kerem; Eraslan, Cihan.
NFC Forum Type Tags, White Paper V1.0, 1 Apr. 2009—Public.
Enhancing Authentication in eBanking with NFC enabled mobile phones, Aug. 11, 2008, Diego Alejandro Ortiz-Yepes.
NFC Data Exchange Format (NDEF), Technical Specification, NDEF 1.0, Jul. 24, 2006.
Simple NDEF Exchange Protocol, Technical Specification, NFC Forum SNEP 1.0, Aug. 31, 2011.
Type 3 Tag Operation Specification, Technical Specification, Technical Specification, NFC Forum, T3TOP 1.1, Jun. 28, 2011.

(56) References Cited

OTHER PUBLICATIONS

Type 2 Tag Operation Specification Technical Specification, T2TOP 1.1 NFC Forum May 31, 2011.
Type 1 Tag Operation Specification, Technical Specification, Technical Specification, NFC Forum T1TOP 1.1, Apr. 13, 2011.
Situated Door Displays and how to interact with them, Barbara Schmid, Jan. 16, 2012.
Application of Near Field Communication for Health Monitoring in Daily Life; Esko Strommer, Jouni Kaartenen, Juha Parkka, Arto Ylisauko-oja, Ilkka Korhonen; Proceedings of the 28th IEEE EMBS Annual International Conference New York City, USA, Aug. 30-Sep. 3, 2006.
Close Contact: An Examination of the Future of Near Field Communications, International Journal of Management & Information Systems-First Quarter 2012 vol. 16, No. 1; Chris Rose Capella.
Violino, Bob. A Summary of Rfid Standards. RFID Standards. RFID Journal. Jan. 16, 2005. URL: at http://www.rfidjournal.com/articles/view?135.
Antoniou, Zoe, "NFC-Based Mobile Middleware for Intuitive User Interaction With Security in Smart Homes", proc. Of the 5th IASTED International Conference on Communication Systems and Networks (CSN'06), Aug. 28-30, 2006, Palma De Mallorca, Spain, Track 543-038, 6pgs.
Ongtang, Machiagar, et al. "Semantically Rich Application-Centric Security in Android", Security and Communication Networks, vol. 5, Issue 6, Jun. 2012, 658-673.
Becher, Michael et al., "Mobile Security Catching Up? Revealing the Nuts and Bolts of the Security of Mobile Devices", 2011 IEEE Symposium on Security and Privacy, 96-11.
Broll, Gregor, et al., "Touch to Play-Exploring Touch-Based Mobile Interaction with Public Displays", 3rd International Workshop on Near Field Communication, Feb. 22, 2011, 15-20.
Chai, Q1, "Design and Analysis of Security Schemes for Low-cost RFID Systems", Doctor of Philosophy Thesis in Electrical and COmputer Engineering, University of Waterloo, Ontario, Canada, 2012, 184 pgs.
Cheng, Hsu-Chen, et al., "A Secure and Practical Key Management Mechanism for NFC Read-Write Mode", J. Computational Information Systems, 7:11, (2011), 3819-3828.
Cheng, Jerry, et al., "SmartSiren: Virus Detection and Alert for Smartphones", MobiSys'07, Jun. 11-4, 2007, San Juan, Puerto Rico, 258-271.
Choi, Kwanghoon, et al., "A Secure Application Invocation Mechanism in Mobile Phones for Near Field Communication", 2012 IEEE International Conference on Consumer Electronics (ICCE), Jan. 2012, 731-732.
Coppolino, Luigi, et al., "A Trusted information Agent for Security Information and Event Management", ICONS 2012: The Seventh International Conference on Systems, 6-12.
Francis, Lishoy, et al., "Practical NFC Peer-to-Peer Relay Attack Using Mobile Phones", The 6th Workshop on RFID Security (RFIDSec 2010), Istanbul, Turkey (LNCS), Jun. 7-9, 2010, 35-49.
Francis, Lishoy, et al., "Practical Relay Attack on Contactless Transactions by Using NFC Mobile Phones", in Cryptology ePrint Archive, Report 2011/618, Nov. 2011, 16pgs.
Hancke, G.P., et al., "Security Challenges for User-Orented RFID Applications within the 'Internet of Things'", J. Internet Technology, vol. 11, No. 3, 2010, 307-313.
Hardy, Robert, et al., "Touch & Interact: Touch-based Interaction of Mobile Phones with Displays", MobileHCI 2008, Proc. 10th international conference on Human computer interaction with mobile devices and services, 245-254.
Haselsteiner, Ernst, et al., "Security in Near Field Communication (NFC): Strengths and Weaknesses", Proceedings of the Workshop on Rfid Security (RFIDSec), Graz, Austria, Jul. 12-14, 2006, 11pgs.
Kazmi, Ham Mad Raza, "Security and Privacy Issues in Near Field Communication (NFC) Systems",Master Thesis, Royal Institute of Technology, Sweden, Apr. 2011, 59 pgs.
Kupusam'&K S et al "A Model for Remote Access and Protection of Smartphones JUsing Short Message Service", International].

Computer Science, Engineering and. Iñformation Technology (IJCSEIT), vol. 2, No. 1, (Feb. 2012), 91-1 00.
Long, Men, et al., "Human Perceivable Authentication: an Economical Solution for Security Associations in Short-Distance Wireless Networking", Proceedings of 16th International Conference on Computer Communications and Networks, Aug. 13-16, 2007.
Mulliner, Collin, "Vulnerability Analysis and Attacks on NFC-enabled Mobile Phones", 2009 International Conference on Availability, Reliability and Security, Fukuoka, Japan.
Anonymous, "Near-field communications will be standard technology for mobiles", Electronics Weekly, (Feb. 21, 2007), p. 8.
"NFC Record Type Definition (RTD)", Technical Specification NFC Forum, RTD 1.0, NFCForum-TS-RTD_1 .0, (Jul. 24, 2006), 20 pgs.
Opoku, Samuel King, "Performance Enhancement of Large-Size NFC Multi-Touch System", Cyber Journals: Multidisciplinary Journals in Science and Technology, Journal of Selected Areas in Telecommunications (JSAT), (Oct. 2011), 52-57.
"Radio Frequency Identification (RFID): A Focus on Information Security and Privacy", OECD_Digital_Economy_Papers,_No._ 138, Jan._14,_2008,_11-81.
Rahnama, Behnam, et al., "Securing RFID-Based Authentication Systems Using ParseKey+", Proceedings of the 3rd International Conference on Security of Information and Networks,_Taganrog,_ Russia,_Sept. 7-11, 2010,_212-217.
Roland, Michael, et al., "Digital Signature Records for the NFC Data Exchange Format", Second International Workshop on Near Field Communication, Monaco, Apr. 20, 2010, 71-.
"South Korea Telecommunications Report Included BMI's Forecasts", Q2 2012, Business Monitor International Ltd., (Apr. 2012), 94 pgs.
Valkkynen, Pasi, et al.,"Suggestions for Visualizing Physical Hyperlinks", PERMID 2006: Pervasive Mobile Interaction Devices—Mobile Devices as Pervasive User Interlaces and Interaction Devices, Dublin, Ireland, May 7, 2006, 245-254.
QR Code Tech Info: MECARD Format, May 2, 2011.
International Preliminary Report on Patentability and Written Opinion dated Jul. 31, 2012 for International Application PCT/US11/022680 filed Jan. 27, 2011.
International Search Report dated Mar. 8, 2011 for International Application PCT/US11/022680 filed Jan. 27, 2011.
International Preliminary Report on Patentability and Written Opinion dated Jul. 31, 2012 for International Application PCT/US11/022687 filed Jan. 27, 2011.
International Search Report dated Mar. 11, 2011 for International Application PCT/US11/022687 filed Jan. 27, 2011.
International Preliminary Report on Patentability and Written Opinion dated Apr. 21, 2015 for International Application PCT/US13/031448 filed Mar. 14, 2013.
International Search Report dated Aug. 6, 2013 for International Application PCT/US13/031448 filed Mar. 14, 2013.
International Preliminary Report on Patentability and Written Opinion dated Mar. 10, 2015 for International Application PCT/US12/031136 filed Mar. 14, 2013.
International Search Report dated May 22, 2013 for International Application PCT/US12/031136 filed Mar. 14, 2013.
International Preliminary Report on Patentability and Written Opinion dated Mar. 4, 2014 for International Application PCT/US12/053322 filed Aug. 31, 2012.
International Search Report dated Nov. 21, 2012 for International Application PCT/US12/053322 filed Aug. 31, 2012.
International Search Report dated Aug. 20, 2013 for International Application PCT/US13/031131 filed Mar. 14, 2013.
Do you talk to each poster? Security and Privacy for Interactions with Web Service by means of Contact Free Tag Readings, Peter Schoo, Massimo Paolucci, Feb. 24, 2009 First International Workshop on Near Field Communication.
Connecting the Mobile Phone with the Internet of Things—Benefits of EPC and NFC Compatibility; Thomas J.P. Wiechert, Florian Michahelles, 2007.
LocaTag-An NFC-based system enhancing instant messaging tools with real-time user location; Kobler, Philip Koene, Helmut Kremar,

(56) References Cited

OTHER PUBLICATIONS

Matthias Altmann, Jan Marco Leimeister, Apr. 20, 2010 Second International Workshop on Near Field Communication.
Near Field Communication in Smartphones, Simon Burkard, Berlin Institute of Technology, Germany, 2012.
Programming Android; Zigurd Mednieks, Laird Domin, G. Blake Meike, Masumi Nakamura, O'Reilly Media, Inc., 2011, http://books.google.co.in/books?id=5BGBswAQSiEC&Ipg=PR5&ots=xSfgivEwS&    dq=rogue%2ONFC%20active%20tags%2Ourl%2Ophone%2Opeer%20to%2Opeer&Ir&pg=PA397#.
Media Clips: Implementation of an Intuitive Media Linker; Seunghyun Yoon, Kyuyun Lee, Hyunchang Shin, Samsung Electronics, 2011 IEEE International Symposium on Broadband Multimedia Systems and Broadcasting (BMSB) held Jun. 8-10, 2011.
A System of Secure Virtual Coupons Using NFC Technology, IEEE Computer Society, CompProceedings of the Fifth Annual IEEE International Conference on Pervasive Computing and Communications Workshops 2007 (PerComW'07); Manfred Aigner, Sandra Dominikus, Martin Feldhofer.
NFC-Based Mobile Interactions with Direct-View Displays; Khoovirajsingh Seewoonauth, Enrico Rukzio, Robert Hardy, and Paul Holleis, IFIP Conference on Human-Computer Interaction—Interact 2009 pp. 835-838.
Secure contactless mobile financial services with Near Field Communication; Adeola Oluwaseyi Poroye, Aug. 2011.
Elliptic Curve Certificates and Signatures for NFC Signature Records, Reasearch in Motion, Certicom Research, Jan. 1, 2011, Tony Rosati, Greg Zaverucha.
Location-Triggered Code Execution-Dismissing Displays and Keypads for Mobile Interaction; W. Narzt and H. Schmitzberger, C. Stephanidis (Ed.): Universal Access in HCI, Part II, HCII 2009, LNCS 5615, pp. 374-383, 2009. © Springer-Verlag Berlin Heidelberg 2009.
QRFactory, Redirectable Qr, http://dashboard.qrfactory.com/, pulled from the internet Apr. 27, 2012.
Touch-driven Interaction Between Physical Space and Cyberspace with NFC, Longbio Chen, Gang Pan, Shijian Li, Department of Computer Science, Zhejiang University Hangzhou, China, 2011 IEEE International Conferences on Internet of Things, and Cyber, Physical and Social Computing.
A Pervasive Presentator - Simplifying the Task of Presenting, Lulea University of Technology; Viktor Lindgren, Mattias Lundberg, Elias Naslund, John Viklund (2012).
The Junction Protocol for Ad Hoc Peer-to-Peer Mobile Applications; Computer Science Department Stanford University; Ben Dodson, Aemon Cannon, Te-Yuan Huang, Monica S. Lam, Apr. 2011.
Physical browsing with NFC technology; Heikki Ailisto, Tapio Matinmikko, Juha Haikio, Arto Ylisaukko-oja, Esko Strommer, Mika Hillukkala, Arto Wallin, Erkki Siira, Aki Poyry, Vili Tormanen, Tua Huomo, Tuomo Tuikka, Sonja Leskinen & Jarno Salonen, Espoo May 2007. VTT Tiedotteita—Research Notes 2400.
Mobile Personal Decives meet Situated Public Displays: Synergies and Opportunities; Alan Dix, Corina Sas (2010). International Journal of Ubiquitous Computing (IJUC), 1(1), pp. 11-28. http://www.hcibook.com/alan/papers/mpd-spd-2010/.
The Mobile Phone as Digital SprayCan; Philip Garner, Omer Rashid, Paul Coulton, and Reuben Edwards, Proceedings of the 2006 ACM SIGCHI international conference on Advances in computer entertainment technology Article No. 12, Hollywood, California, USA — Jun. 14-16, 2006.
Husni, Emir, et al., "Efficient Tag-to-Tag Near Field Communication (NFC) Protocol for Secure Mobile Payment", 2nd International Conference on Instrumentation, Communications, Information Technology, and Biomedical Engineering (ICICI-BME), Bandung, Indonesia, Nov. 8-9, 2011, 97-101.
Kfir, Ziv, et al., "Picking Virtual Pockets using Relay Attacks on Contactless Smartcard Systems", Proceeding of the First International Conference on Security and Privacy for Emerging Areas in Communications Networks, Sep. 5-9, 2005, 47-58.
Madlmayr, Gerald, etal., "NFC Devices: Security & Privacy", Proceedings of the 3rd International Conference on Availability, Reliability and Security, Barcelona, Spain, Mar. 7, 2008, 13 pgs.
Smart Poster Record Type Definition Technical Specific MFC Forum TM Spr 1.1 NECEorum-SmartPoster_RTD_1.0, Jul. 24, 2006.
European Search Report dated Nov. 25, 2016 for European Application No. EP16002075 filed Sep. 26, 2016.

* cited by examiner

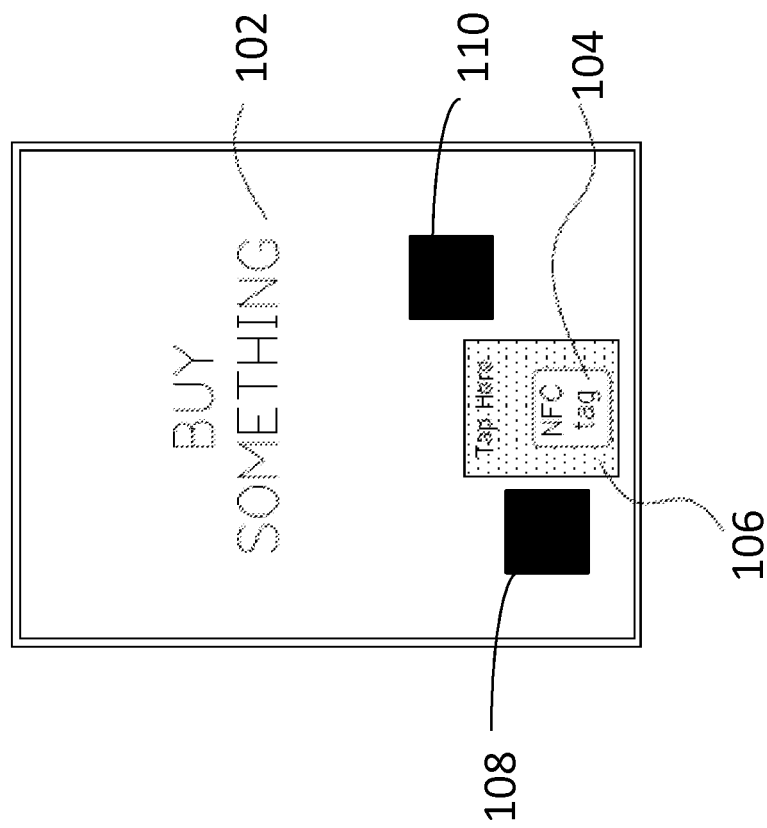

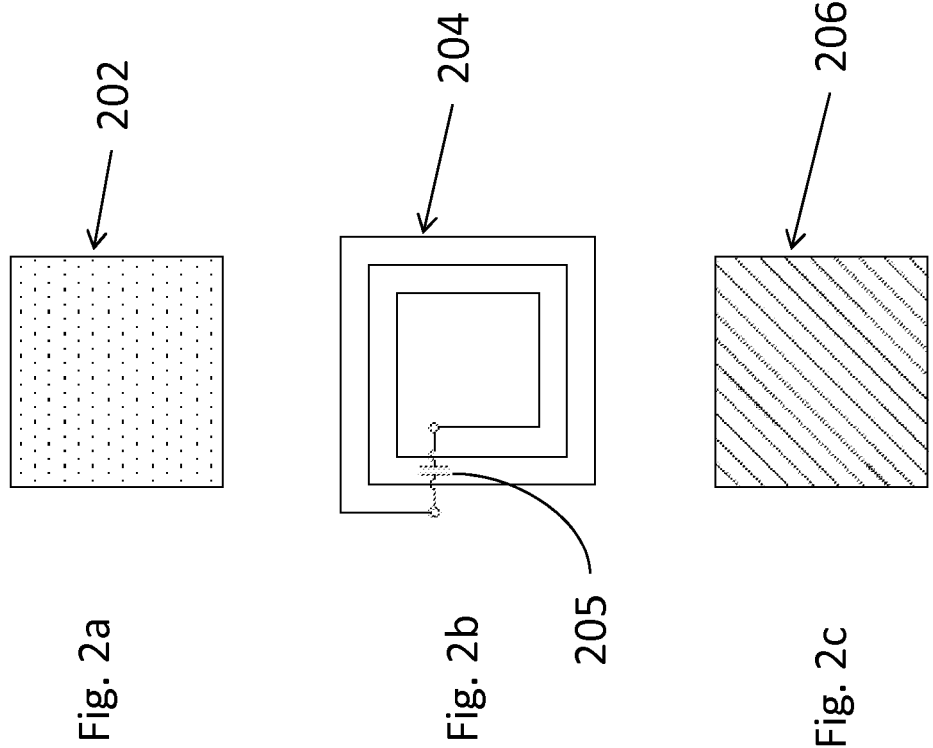

METHOD FOR PREVENTING UNAUTHORIZED DIVERSION OF NFC TAGS

CROSS-REFERENCE TO RELATED APPLICATION

The present application claims the benefit of U.S. Provisional Patent Application No. 61/698,839 filed Sep. 10, 2012, which is incorporated herein by reference in its entirety.

BACKGROUND

Radio frequency identification (RFID) devices, including near field communication (NFC) enabled RFID devices, are utilized for a variety of purposes. Often such devices are formed as tags or labels and can be utilized to associate an object with an identification code or other data, such as website data. Such RFID devices may be passive and, upon receiving a signal, such as an excitation signal from an RFID or NFC-enabled reader, may be energized. The devices can then respond with a desired communication or provide information associated with a product, item or service associated with the RFID device.

Specifically, NFC is a data exchange protocol designed to allow devices, including suitably equipped mobile phones and the like, to interact with infrastructures, such as point of sale terminals and ticket gates on transportation systems, or RFID devices in the forms of "smart posters" or "touchpoints", for example. In such situations, bringing an NFC enabled device into proximity of such infrastructure or RFID devices can cause the transmission of data to the NFC enabled device, resulting in, for example, the opening of a web page, the acceptance of a media stream via Bluetooth or any of a number of other functions.

Often the manner of associating a product, item or service with an RFID device is to physically couple or adhere, attach, affix, etc., the RFID device to the product or item, or associate it with advertising, packaging or marketing materials relating to the product, item or service, such as the "smart poster" creating a "touchpoint" described herein. For example, RFID labels may be coupled adhesively or mechanically (permanent pressure sensitive adhesive to thwart removal, switchable or removable adhesives so the RFID tag can be removed, or mechanical or other physical attachment, e.g. hook and loop type fasteners) to objects or may otherwise have surfaces that attach directly to objects. RFID tags may be secured to object in other manners, such as through the use of a plastic fastener, string or other fastening mechanism. Such RFID devices may then provide data to NFC enabled devices located or placed proximate the RFID devices.

Additionally, RFID devices are often associated with the product or item, packaging or advertising item, in such a manner as to conceal or secure the RFID device. Such methods can provide security against the removal or misuse of an RFID device. However, in such circumstances, and particularly with NFC enabled devices designed to convey information to consumers with NFC enabled mobile phones and devices, there is a designated area (touchpoint) on an advertisement, packaging or product that indicates information can be obtained if the NFC enabled device is placed in close proximity to an area associated with the RFID device. However, as it is then known that information can be obtained from such areas, vandal or "pirate" RFID devices are often placed in close proximity to the indicated NFC area. The vandal or pirate devices often contain deceptive, misleading, undesired, counterfeit or malicious information. These devices can be coupled with or adhered to products and items, or advertisements associated with those items, leading to inappropriate or malicious information being unknowingly communicated to a user's NFC-enabled device including the perpetration of a fraud in an effort to market or sell counterfeit goods and/or services.

SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

A method, system and apparatus for pairing authorized NFC enabled RFID devices with an intended object, product or service and detuning unauthorized or pirate RFID devices is described. An exemplary method can include the steps for forming at least a primary radio frequency identification device with a radio frequency identification chip, a coil antenna, a bridge and a substrate; associating the at least primary radio frequency identification device with an object; integrating a material into one of the at least primary radio frequency identification device and the object that provides the radio frequency identification device with a predetermined resonant frequency; and detuning one or more secondary communication devices located proximate the radio frequency identification device.

An exemplary device that allows for authorized NFC enabled RFID devices with an intended object or product may also be described. The NFC enabled RFID device can include a label or tag substrate formed with a load compensator; a radio frequency identification chip coupled to the substrate; a coil antenna formed on the substrate; and a bridge.

In still further exemplary embodiments, a system for blocking unauthorized radio frequency communications may be described. The system can include a near field communication (NFC) enabled radio frequency identification device; an object to which the radio frequency identification device is associated; and a substrate formed integrally with at least one of the radio frequency identification device and the object, the substrate comprising at least one of a high dielectric material, a high permeability material, a resonant inductive circuit, and a conductive region.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Advantages of embodiments of the present invention will be apparent from the following detailed description of the exemplary embodiments. The following detailed description should be considered in conjunction with the accompanying figures in which:

FIG. 1b is an exemplary view of a smart poster or marketing piece with an authorized RFID device and unauthorized RFID devices;

FIG. 2a is an exemplary view of a substrate used in conjunction with an RFID device;

FIG. 2b is another exemplary view of a substrate used in conjunction with an RFID device;

FIG. 2c is yet another exemplary view of a substrate used in conjunction with an RFID device;

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Generally referring to FIGS. 1-3, additional materials, such as high relative permeability ferrite, high dielectric constant ceramic, a combination of both, a conductor, such as aluminum and a resonant or partially resonant conductor structure, may be utilized to provide desired NFC communication. In some exemplary embodiments, the additional materials may be built into a sign or surface, or integrated into a desired RFID tag. Thus, a design of the RFID tag may be such that, when it is in proximity to the material or structure, its resonant frequency is near or at 13.56 MHz. However, commonly available NFC tags designed for near free space loading conditions are detuned, making it unlikely to operate or significantly reducing the read range.

Figure 1A:
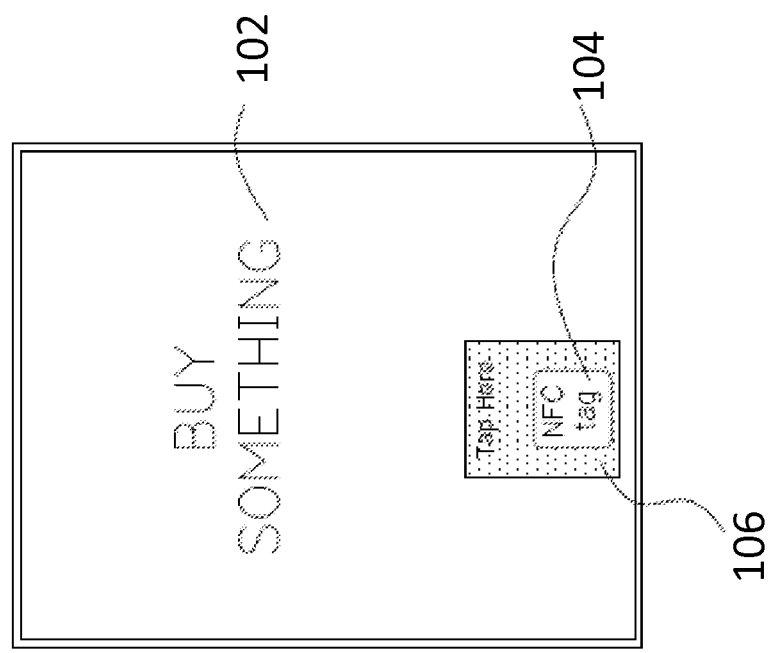
FIG. 1a is an exemplary view of a poster with an authorized RFID device.

FIGS. 1a and 1b provide exemplary views of a poster 102 that incorporates a tag 104, such as an RFID tag or device with NFC capabilities, with a method of mitigating, detuning or rendering inoperable vandal or unauthorized tags. Exemplary RFID tags, labels or inlays for use in this invention are available from Avery Dennison RFID Company of Clinton, S.C. As used herein, RFID tag includes RFID labels, inlays, intermediates and similar structures Near field RFID applications may have limited distances for interrogation by mobile devices and may be utilized to provide targeted or specific information about an item, marketing, advertising, packaging or service onto which the RFID tag 104 may be affixed or otherwise associated. An interrogation range of two inches or less is typical for 13.56 MHz RFID technology. In exemplary FIG. 1a, the authorized RFID tag 104 may be designed to have a resonant loaded frequency near the operational frequency when placed on a high permeability sheet or substrate. The design of the RFID tag 104 to compensate for proximity to the high permeability material can be achieved by techniques such as, but not limited to, reducing the inductance of the antenna coil through fewer coil loops or introducing magnetic field blocking metal structures, selecting a RFID chip with less internal capacitance or reducing the size of capacitive antenna structures, as may be described and shown in more detail below. The resonant frequency can refer to the frequency of the alternating magnetic field in which maximum power can be transferred between the interrogator and the RFID tag 104. The loaded resonant frequency can be the resonant frequency of the RFID tag when placed in the configuration found in an application use case. In this example, RFID tag 104 may be placed on poster 102. Poster 102 may further have a touchpoint or NFC communication area 106 which provides users with NFC enabled devices to acquire information or data associated with poster 102. As described above, typical interrogation ranges for such devices are about 2 inches. In some exemplary embodiments, RFID tag 104 or touchpoint 106 can be formed with materials that detune or otherwise impair the use of any unauthorized or undesired communication devices placed in proximity to RFID tag 104 or touchpoint 106.

Referring now to exemplary FIG. 1b, most commonly available HF RFID tags are designed for benign dielectric loading of the antenna coil structure via proximity to paper or thin plastic. These HF RFID tags, such as tags 108 and 110, are often placed in proximity to authorized or known tags providing information, such as RFID tag 104, so as to hijack the signal of a mobile device and provide undesired, unauthorized or malicious information. If one or more HF RFID tags 108, 110, for example, that are not designed to compensate for the proximity to high permeability materials are affixed in or proximate the designated interrogation region 106 shown in FIG. 1b, the loaded resonant frequency of those RFID tags 108, 110 may be significantly altered. This can render uncompensated tags 108, 110 detuned, with too small an interrogation distance for practical use by mobile devices, or effectively inoperable. Further, the desired communications from the RFID tag 104 and a mobile device may take place, unhindered by any of the uncompensated HF RFID tags 108, 110.

Exemplary FIGS. 2a, 2b and 2c are schematic views of substrates that can significantly modify the performance of RFID tags when placed in close proximity to such tags. The substrates may be identified as a relatively high dielectric substrate 202, resonant inductive circuit substrate 204 and relatively high permeability substrate 206. Such substrates can be built into or otherwise incorporated onto an object or item with which an RFID tag is associated, such as packaging, a poster or other marketing or advertising collateral.

In exemplary FIGS. 2a and 2c, respectively, the high relative dielectric substrate 202 and high permeability substrate 206 may achieve a significant resonant frequency change by altering the effective wavelength in the area of the RFID tag, such as touchpoint area 106 of RFID tag 104 from exemplary FIGS. 1a and 1b. For example, relatively high dielectric substrate 202 may utilize high relative dielectric materials, such as, but not limited to, ceramic materials, and relatively high permeability substrate 206 may utilize high relative permeable materials, such as, but not limited to, ferrite materials. Thus, substrate 202 can reduce the loaded resonant frequency of NFC tags that are placed in proximity of a tag using substrate 202.

In exemplary FIG. 2b, the inductive circuit substrate 204 can achieve a change in the RFID tag, such as RFID tag 104 from exemplary FIGS. 1a and 1b, through a coupling 205 of two inductors together, which can create a mutual inductance between the inductive circuit and an RFID circuit in close proximity.

An exemplary method of using substrates 202, 204, and 206 may be to have an authorized or intended RFID tag (e.g. RFID tag 104) designed for a loaded resonant frequency that can compensate for these atypical substrates 202, 204 and 206. Alternatively, unauthorized or vandal tags 108 and 110 (FIG. 1b) that are designed for benign substrates typical to many application use cases will have their performance significantly impaired or rendered incapacitated. For example, vandal tags 108 and 110 in FIG. 1b may be unable to provide their unauthorized signals if an authorized RFID tag, such as RFID tag 104, were paired with one of substrates 202, 204 and 206.

Thus, and still referring to exemplary FIGS. 2a-c, the use of any of the substrates 202, 204, and 206 can form the concept of a needing a special "keyed" or authorized RFID device to function on the surface. Therefore, in order to operate properly, there may be knowledge of the substrate's (202, 204, 206) inductive circuit loading conditions that can allow for an authorized RFID tag to properly work. Any unauthorized or vandal tags without this knowledge or special key, may not function to provide their intended communication capabilities.

Figure 3A:
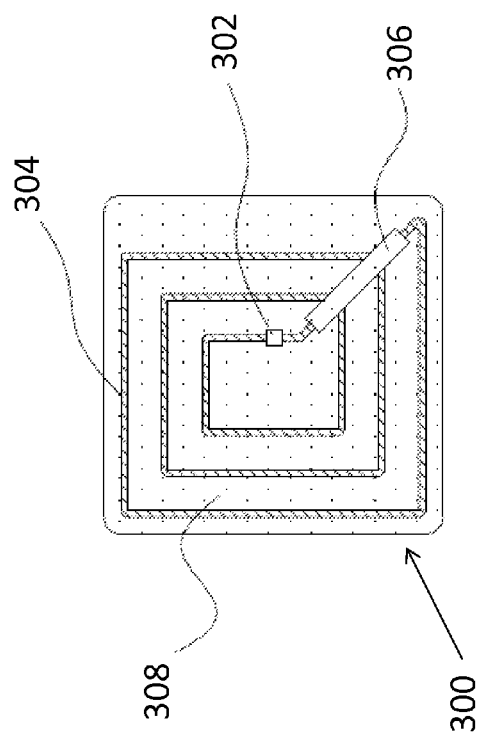
FIG. 3a is an exemplary schematic view of an RFID device with a substrate used as a load compensator.

Exemplary FIG. 3a is a schematic view that demonstrates the concept where an authorized RFID tag 300 directly incorporates circuit compensating techniques that allow for the basic design of a RFID tag, including chip 302, coil antenna 304 and bridge 306 to remain standard. In such an exemplary embodiment, RFID tag 300 may be a NFC-enabled tag. Thus, these methods can allow commonly available RFID tags designed for benign loading conditions to be utilized as keyed or authorized RFID tags, or may allow the compensating methods to be added to the RFID tags at a later time.

In RFID tag 300, ferrite material in the tag substrate 308 can increase the effective wavelength in the inductive circuit. Thus, when the RFID tag 300 is placed on a substrate 308 that effectively increase the loaded resonant frequency, the ferrite substrate 308 can provide a compensator to achieve a desired resonant frequency, such as 13.56 MHz. In contrast, vandal RFID tags (not pictured) without such compensating methods can be significantly detuned by the substrate 308 on a poster or other object. Additionally, if a vandal tag is placed over the authorized RFID tag 300 or inlay that incorporates a compensator, the vandal tag can be significantly detuned as well.

Figure 3B:
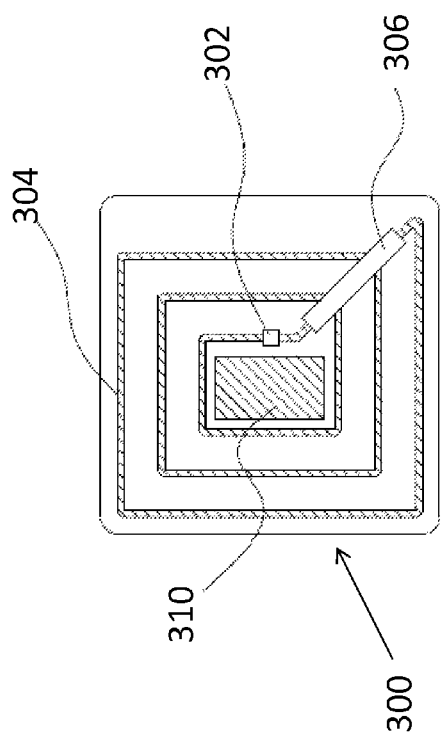
FIG. 3b is another exemplary schematic view of an RFID device with a conductive region used as a load compensator.

In exemplary FIG. 3b, an authorized RFID tag 300 can incorporate a conductive region 310 as a substrate load compensator. The conductive region 310 can be added as part of the antenna coil 304 manufacturing process or at a separate manufacturing process step. The addition of the conductive region 310 can cause a decrease in the inductance of antenna coil 304 by disrupting the magnetic field lines of the inductive coil 304. When the authorized RFID tag 300 is placed in the intended region on the poster (such as touchpoint 106 shown in exemplary FIGS. 1a and 1b), a correct or desired loaded resonant frequency may be achieved which can be close to the RFID operating frequency, about 13.56 MHz. In contrast, vandal tags which do not incorporate load compensators can be significantly detuned by either a substrate in the poster, a substrate of the tag or an inductive circuit on the tag. Additionally, as with RFID tag 300 in FIG. 3A, placing a vandal tag directly onto the intended tag will cause the compensating method to significantly detune the vandal tag rendering the vandal or pirate tag inoperable or significantly weakened.

In still further exemplary embodiments, any of a variety of keyed inductive circuits may be utilized on RFID tags, such as RFID tag 300. In some exemplary embodiments, irregularly shaped RFID tags can be formed that avoid short circuit patches of metal. Alternatively, combinations of different substrate loading techniques that can utilize combinations of compensating methods may be incorporated into an authorized RFID tag. In still other exemplary embodiments, combinations of unique tag shapes with compensating methods for substrate loading methods may be utilized.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for pairing an NFC enabled RFID device with an object comprising:
   providing at least one RFID device with a RFID chip, an antenna, a bridge, and a substrate;
   associating the at least one RFID device with the object;
   integrating a material into the at least one RFID device and the object the material provides the RFID device with a desired resonant frequency; and
   detuning one or more unauthorized communication devices that are not designed for a loaded resonant frequency to compensate for the material located in the at least one RFID device.

2. The method of claim 1, wherein the antenna is a coil antenna.

3. The method of claim 1, wherein the RFID device is placed on a poster.

4. The method of claim 2, wherein the poster has a touch point area.

5. The method of claim 4, wherein the touch point detunes the use of any of the unauthorized communication devices placed in proximity to the RFID device.

6. The method of claim 1, wherein the substrate comprises at least one of a dielectric material, a permeability material, a resonant inductive circuit, and a conductive region.

7. The method of claim 1, wherein the at least one RFID device has an interrogation range of two inches or less.

8. The method of claim 1, wherein the at least one RFID device incorporates a conductive region as a load compensator.

9. The method of claim 1, wherein the material is a high relative permeability ferrite.

10. The method of claim 1, wherein the material is a high constant ceramic or a conductor.

11. The method of claim 1, wherein the material is a combination of a high relative permeability ferrite and a high dielectric constant ceramic.

12. The method of claim 1, wherein the loaded resonant frequency is a resonant frequency of the RFID tag when placed in a configuration found in an application use case.

* * * * *